United States Patent
Saitou

(10) Patent No.: US 10,289,087 B2
(45) Date of Patent: May 14, 2019

(54) MOTION CONTROLLER

(71) Applicant: FANUC Corporation, Yamanashi (JP)

(72) Inventor: Manabu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/399,851

(22) Filed: Jan. 6, 2017

(65) Prior Publication Data

US 2017/0199504 A1    Jul. 13, 2017

(30) Foreign Application Priority Data

Jan. 13, 2016    (JP) ................................. 2016-004713

(51) Int. Cl.
| | |
|---|---|
| H02P 6/16 | (2016.01) |
| G05B 19/042 | (2006.01) |
| G05B 19/414 | (2006.01) |
| G05B 15/02 | (2006.01) |

(52) U.S. Cl.
CPC ......... G05B 19/042 (2013.01); G05B 19/414 (2013.01); *G05B 2219/23288* (2013.01); *G05B 2219/34206* (2013.01); *G05B 2219/34406* (2013.01)

(58) Field of Classification Search
CPC ....... G05B 19/048; G05B 17/02; G05B 11/36
See application file for complete search history.

(56) References Cited

U.S. PATENT DOCUMENTS

| | | | |
|---|---|---|---|
| 2012/0299523 A1* | 11/2012 | Inoue ...................... | H02P 31/00 318/558 |
| 2013/0285589 A1* | 10/2013 | Sugie ................. | G05B 19/4155 318/600 |
| 2016/0274552 A1* | 9/2016 | Strohmenger ......... | G05B 11/01 |

FOREIGN PATENT DOCUMENTS

| | | |
|---|---|---|
| JP | 2008-129751 A | 6/2008 |
| JP | 2013073351 A | 4/2013 |

OTHER PUBLICATIONS

Notice of Allowance in JP Application No. 2016-004713, dated May 22, 2018, 6pp.

* cited by examiner

*Primary Examiner* — Bickey Dhakal
*Assistant Examiner* — Charles S Laughlin
(74) *Attorney, Agent, or Firm* — Hauptman Ham, LLP

(57) ABSTRACT

A motion controller has an axis control part and a communication control part. The motion controller includes: a control function storage part that stores a control function received from a higher-level control device by the communication control part; a control function execution part that executes the control function regarding at least one of information of a motor and information of a sensor as an input; and a control information changing part that changes the motor control information based on a result of execution of the control function stored in the control function storage part, the execution of the control function being performed by the control function execution part. The motor control information changed by the control information changing part serves as an input to the axis control part.

4 Claims, 6 Drawing Sheets

MOTION CONTROLLER

RELATED APPLICATIONS

The present application claims priority to Japanese Patent Application Number 2016-004713, filed Jan. 13, 2016, the disclosure of which is hereby incorporated by reference herein in its entirety.

BACKGROUND OF THE INVENTION

Field of the Invention

The present invention relates to a motion controller, and in particular, relates to a motion controller capable of customizing a highly responsive command to a motor by a higher-level control device.

Description of the Related Art

In a motion controller performing adaptive control by a command from a higher-level control device, high responsiveness to feedback information of a sensor is needed. To improve the responsiveness, speed up of a communication cycle between the higher-level control device and a controller or speed up of a cycle, in which a command calculated by the higher-level control device based on the feedback information (position or speed) is reflected to a motor, is carried out.

FIG. 5 is a functional block diagram of a motion controller of a conventional art. A motion controller 10 of the conventional art is connected to a higher-level control device 20 by a communication unit performing real-time communication using EtherCAT or others, and receives a motor control command by a communication control part 11 in the motion controller 10, the motor control command being transmitted from the higher-level control device 20. Then, based on a value of the received motor control command, the motion controller 10 updates motor control information used for controlling a motor 2, the motor control information being stored in a motor control information storage part 13 provided on a not-shown memory. The motor control information stored in the motor control information storage part 13 is inputted to an axis control part 12, and the axis control part 12 controls an amplifier 3 based on the inputted motor control information, to thereby drive the motor 2 attached to a machine to be controlled. Moreover, a value of a sensor 5 attached to the machine to be controlled is inputted to the higher-level control device 20 by the communication control part 11. Note that the higher-level control device 20 is connected to an operating panel or others of the machine via an I/O unit 30, and thereby receives operation onto the operating panel by an operator.

FIG. 6 is a diagram showing an example of controlling the machine by the motion controller and the higher-level control device of the conventional art. Note that, in FIG. 6, partial illustration, such as the motor control information storage part 13, is omitted. The higher-level control device 20 includes a command calculation processing part 21 that creates a motor control command to direct a target position or the like of the motor 2, and the command calculation processing part 21 is connected to the communication control part 11 provided to the motion controller 10.

The axis control part 12 controls the amplifier 3 in response to the value of the motor control information, such as a moving amount or a torque limit, to thereby drive the motor 2. From the higher-level control device 20 to the motion controller 10, the target position is successively transmitted by the motor control command, and converted into the moving amount of the motor control information and inputted to the axis control part 12; accordingly, the motor 2 is operated to follow the inputted target position by performing positional control.

In the machine to be controlled by the higher-level control device 20 and the motion controller 10, there is a mechanical part 4 driven by rotation of the motor 2, and moreover, in an operating range of the mechanical part 4, a processed part 6, to which a pressure sensor 5a is attached, is placed, to thereby try to perform a pressing operation with a constant pressure.

When the motion controller 10 of the conventional art is used in controlling such a system, in accordance with a value of sensor information detected by the pressure sensor 5a, the command calculation processing part 21 of the higher-level control device 20 calculates the target position and the torque limit of the motor as the motor control command. The motion controller 10 converts the target position of the received motor control command into the moving amount per, for example, encoder unit of the motor control information, and regards the moving amount as an input to the axis control part 12.

However, if the motor control command and the motor control information have the same definition, the conversion may not be carried out.

Note that, as a conventional art for achieving high responsiveness, for example, in the technique disclosed in Japanese Patent Laid-Open No. 2013-73351, multiple-divided control computing portions according to characteristics of respective axes of a control device are distributed to a servo amplifier or a servo controller, to thereby increase control responsiveness in servo control.

However, in the control of the motor by the motion controller of the conventional art, since the measurement value of a sensor is fed back to the higher-level control device, and the command to the motor is changed by use of the value, it was difficult to improve responsiveness of the entire system due to communication delay. For instance, in the example of FIG. 6, if the higher-level control device 20 monitors the value of sensor information detected by the pressure sensor 5a and fed back to the motion controller 10 and performs control of the motor 2, the responsiveness with respect to fluctuation in the pressure value is deteriorated due to the influence of delay in communication time between the higher-level control device 20 and the motion controller 10. Moreover, if a process using the sensor information is incorporated into the axis control part 12 for improving the responsiveness, the higher-level control device 20 can merely select a control method to be executed from those incorporated into the axis control part 12, and thereby a problem of reducing flexibility in control occurs.

Moreover, by applying the technique disclosed in Japanese Patent Laid-Open No. 2013-73351 to the motion controller 10, it is possible to perform part of the servo control incorporated into the motion controller 10 in high-speed cycle; however, it is impossible to improve responsiveness of the process calculating the command of the position or speed performed by the higher-level control device 20.

SUMMARY OF THE INVENTION

An object of the present invention is to provide a motion controller capable of customizing a highly responsive command to a motor by a higher-level control device.

In the motion controller of the present invention, control functions transmitted from the higher-level control device are registered and executed, to thereby reduce the communication time with the higher-level control device. Moreover, as-needed highly responsive control of the motor can be executed by the command from the higher-level control device.

A motion controller according to the present invention has an axis control part that is connected to an amplifier to drive a motor and controls the amplifier based on motor control information and a communication control part that receives a motor control command by communication with a higher-level control device, the motor control command serving as a source of the motor control information, and the motion controller includes: a control function storage part that stores a control function received from the higher-level control device by the communication control part; a control function execution part that executes the control function regarding at least one of information of the motor and information of a sensor as an input; and a control information changing part that changes the motor control information based on a result of execution of the control function stored in the control function storage part, the execution of the control function being performed by the control function execution part, wherein the motor control information changed by the control information changing part serves as an input to the axis control part.

In the motion controller according to the present invention, the control function execution part is capable of using information of another motor, which is different from the motor, for inputting the control function.

In the motion controller according to the present invention, the control function execution part is capable of selecting a control function to be executed from among multiple control functions in synchronization with a motor control command, and the control information changing part changes the motor control information by a result of execution of the selected control function.

In the motion controller according to the present invention, the communication control part receives the control function by dividing the control function into multiple communications in synchronization with the motor control command.

In the motion controller according to the present invention, the communication control part receives the control function in a communication cycle different from a communication cycle of the motor control command.

According to the present invention, since the motion controller is capable of operating in a cycle different from a communication cycle with the higher-level control device, it becomes possible to perform control to respond at high speed to sensor feedback information which the motion controller directly inputs and outputs. Moreover, by re-registering the control function in the course of operation, it becomes possible to customize the control in accordance with the purpose of the higher-level control device. In particular, since unique control and normal control can be switched, a response to unique conditions according to a machine can be achieved.

BRIEF DESCRIPTION OF THE DRAWINGS

The foregoing and other objects and features of the present invention will become apparent from the following description of the embodiments in connection with the accompanying drawings, wherein.

DETAILED DESCRIPTION OF THE PREFERRED EMBODIMENTS

Hereinafter, embodiments of the present invention will be described with reference to the accompanying drawings.

As described above, the control functions transmitted from the higher-level control device can be registered to the motion controller of the present invention. The motion controller executes the registered control functions per every control cycle, to thereby calculate motor control information used for controlling the motor or the like.

In inputting the control functions to be registered to the motion controller of the present invention, a sensor value obtained from a motor or a connected sensor and a command value of a motor control command received from the higher-level control device are used, and a command to an amplifier, such as a position, speed, torque or pressure and a torque limit of the motor, or a correction amount thereof or the like is outputted as an execution result of the control functions. Then, the motion controller of the present invention changes the motor control information by the command or the correction amount, which is the output of the control function, to thereby perform axis control of the motor by the changed motor control information.

<First Embodiment>

Figure 1:
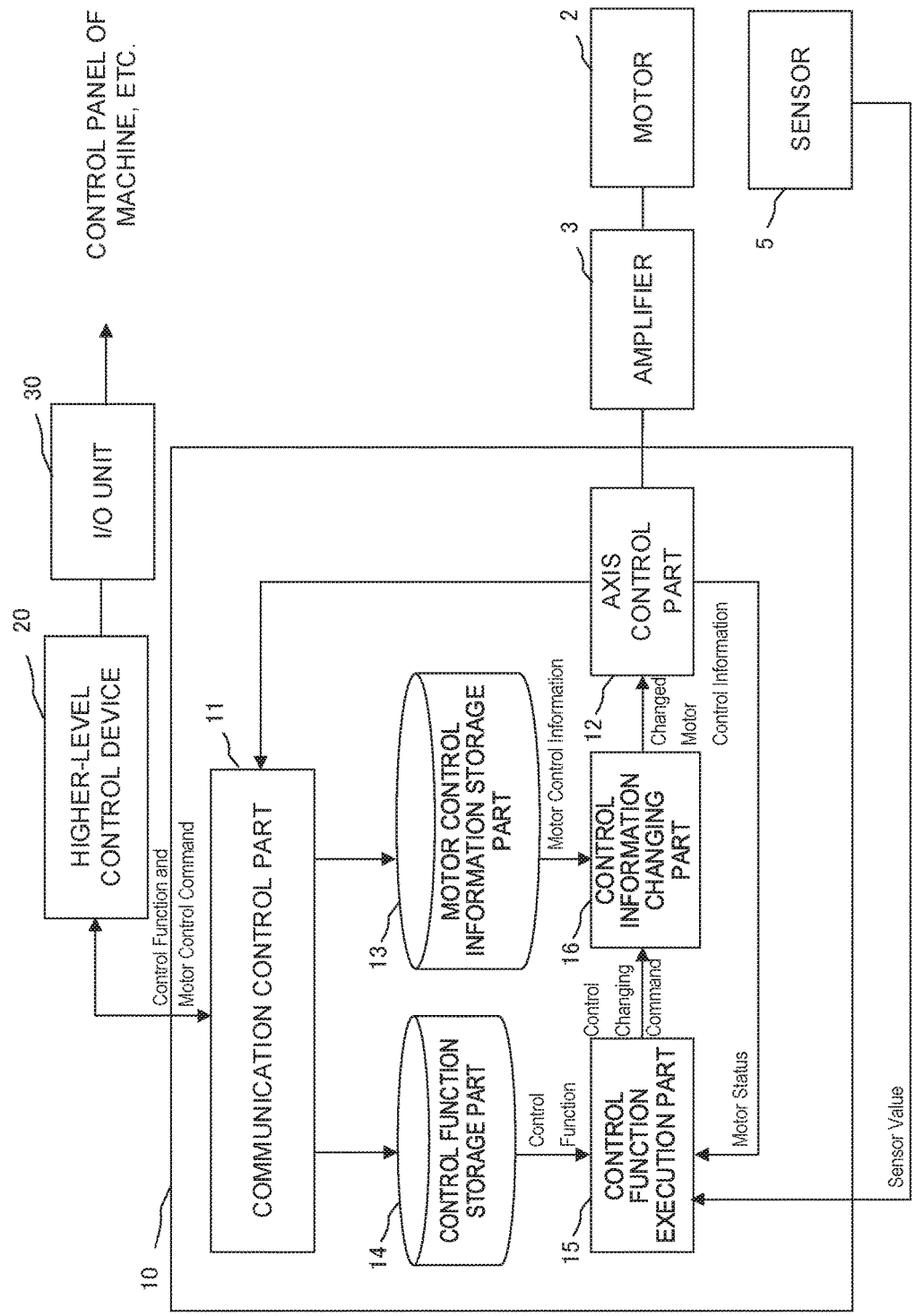
FIG. 1 is a functional block diagram of a motion controller according to a first embodiment of the present invention.

FIG. 1 is a functional block diagram of a motion controller according to a first embodiment of the present invention. Similar to the motion controller 10 of the conventional art, a motion controller 10 of this embodiment is connected to a higher-level control device 20 by a communication unit, and receives a motor control command and a control function by a communication control part 11 in the motion controller 10, the motor control command and the control function being transmitted from the higher-level control device 20. Based on a value of the received motor control command, the motion controller 10 updates motor control information used for controlling a motor 2, the motor control information being stored in a motor control information storage part 13 provided on a not-shown memory, and stores the received control function into a control function storage part 14 provided on the not-shown memory.

The control function transmitted from the higher-level control device 20 is a function for outputting a command value to an amplifier such as, a position, speed, torque or pressure and a torque limit of the motor, or a correction amount thereof while regarding a sensor value obtained from the motor or a connected sensor and a command value of the motor control command received from the higher-level control device as an input (argument). The control function can be in a form of, for example, a calculation formula or a program; however, the control function may be implemented in any form as long as at least calculation or execution can be performed in a control function execution part 15 of the motion controller 10, and one or more outputs can be obtained based on the input. The control function may be a character string or data in a binary format. Moreover, the processing included in the control function is not limited to numerical processing, such as the four basic arithmetic operators; however, the processing can include the execution control, such as conditional branching.

The control function storage part 14 is able to store multiple control functions. When the motion controller 10 stores the control functions into the control function storage part 14, the control functions are stored in such a manner that the control function execution part 15, which will be described later, can determine which of the control functions is to be executed. For example, when one or multiple control functions are transmitted from the higher-level control device 20, the motion controller 10 may delete all the control functions stored in the control function storage part 14 and may store the newly received control functions to the control function storage part 14. Moreover, in storing a control function into the control function storage part 14, when a control function that outputs the same kind of command value or correction value has already been stored, the motion controller 10 may delete the previously stored control function, and thereafter, store the new control function.

The control function execution part 15 executes the control function stored in the control function storage part 14 per every control cycle of the motion controller 10, and outputs a command value or a correction value, which was outputted as the execution result, to a control information changing part 16 as a control changing command. The control function execution part 15 uses a value indicating a status of the motor 2 obtained from the axis control part 12, a sensor value obtained from the sensor 5, a command value of the motor control command received from the higher-level control device 20 or others as the input (argument) in executing the control function. The control function execution part 15 executes a control function to be executed from among the control functions stored in the control function storage part 14. The control function to be executed by the control function execution part 15 is dependent on a storage method of the control function to the control function storage part 14. For example, when the control function storage part 14 is configured not to store the control functions outputting the same kind of command value or correction value, the control function execution part 15 may be configured to assume all the control functions stored in the control function storage part 14 as the control functions to be executed.

Based on the motor control information stored in the motor control information storage part 13 and the control changing command inputted from the control function execution part 15, the control information changing part 16 creates motor control information to be used for controlling the motor 2, and outputs the created motor control information to the axis control part 12. When the control changing command includes a command value, the control information changing part 16 updates the motor control information with the command value, and when the control changing command includes a correction value, the control information changing part 16 corrects the same kind of command value included in the motor control information with the correction value, to thereby create the motor control information to be used for controlling the motor 2.

Figure 2:
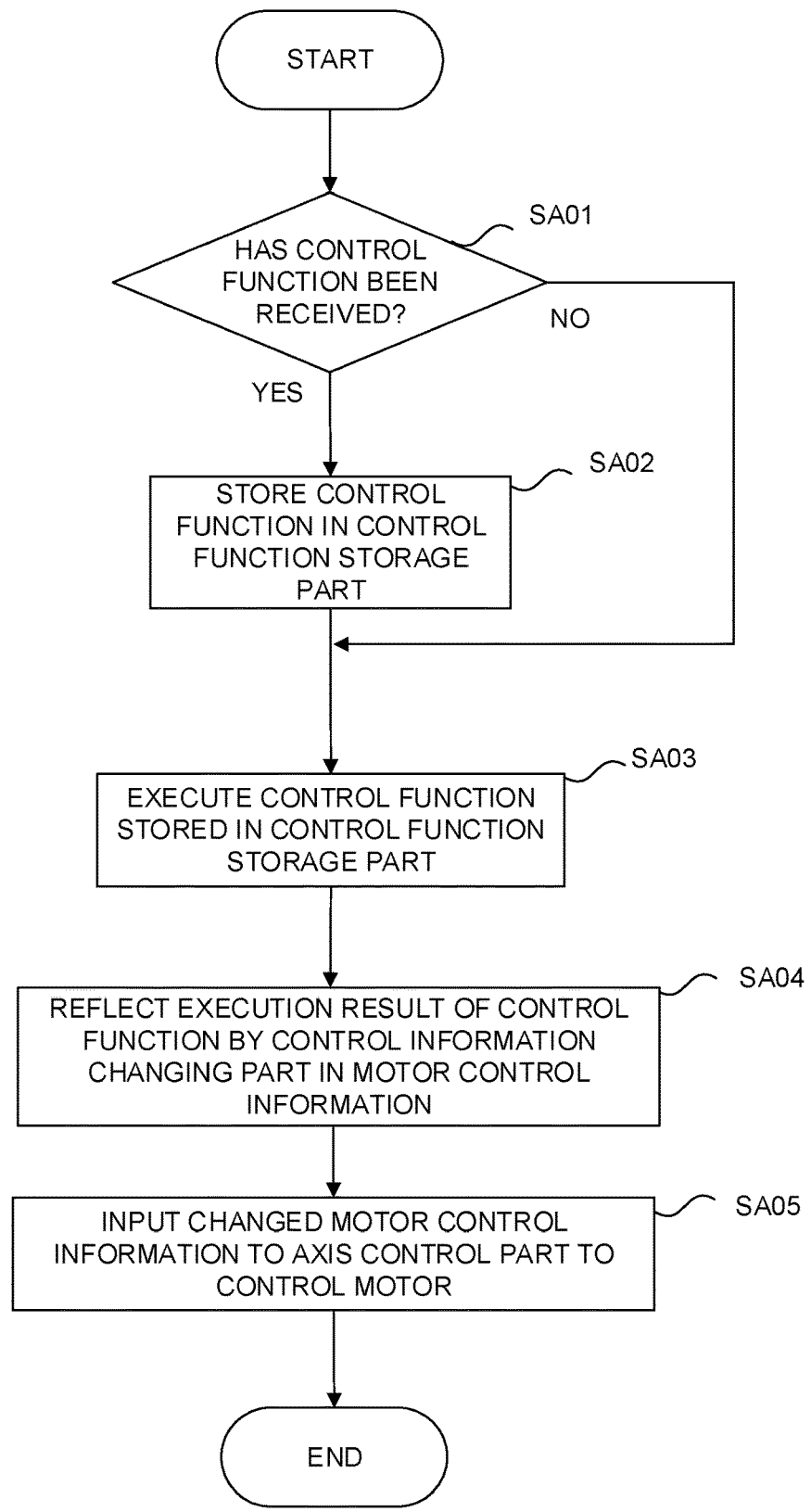
FIG. 2 is a flowchart showing a process executed in the motion controller shown in FIG. 1.

FIG. 2 is a flowchart showing a process executed by the motion controller 10 shown in FIG. 1 per every control cycle.

[Step SA01] The communication control part 11 determines whether a control function has been received from the higher-level control device 20. When the control function has been received, the process proceeds to step SA02, and when the control function has not been received, the process proceeds to step SA03.

[Step SA02] The communication control part 11 stores the received control function to the control function storage part 14.

[Step SA03] The control function execution part 15 executes the control function stored in the control function storage part 14.

[Step SA04] The control information changing part 16 reflects the execution result of the control function executed by the control function execution part 15 in the motor control information.

[Step SA05] The control information changing part 16 inputs the motor control information, in which the execution result of the control function was reflected in step SA04, to the axis control part 12, and the axis control part 12 controls the amplifier 3 based on the inputted motor control information, to thereby drive the motor 2.

Figure 3:
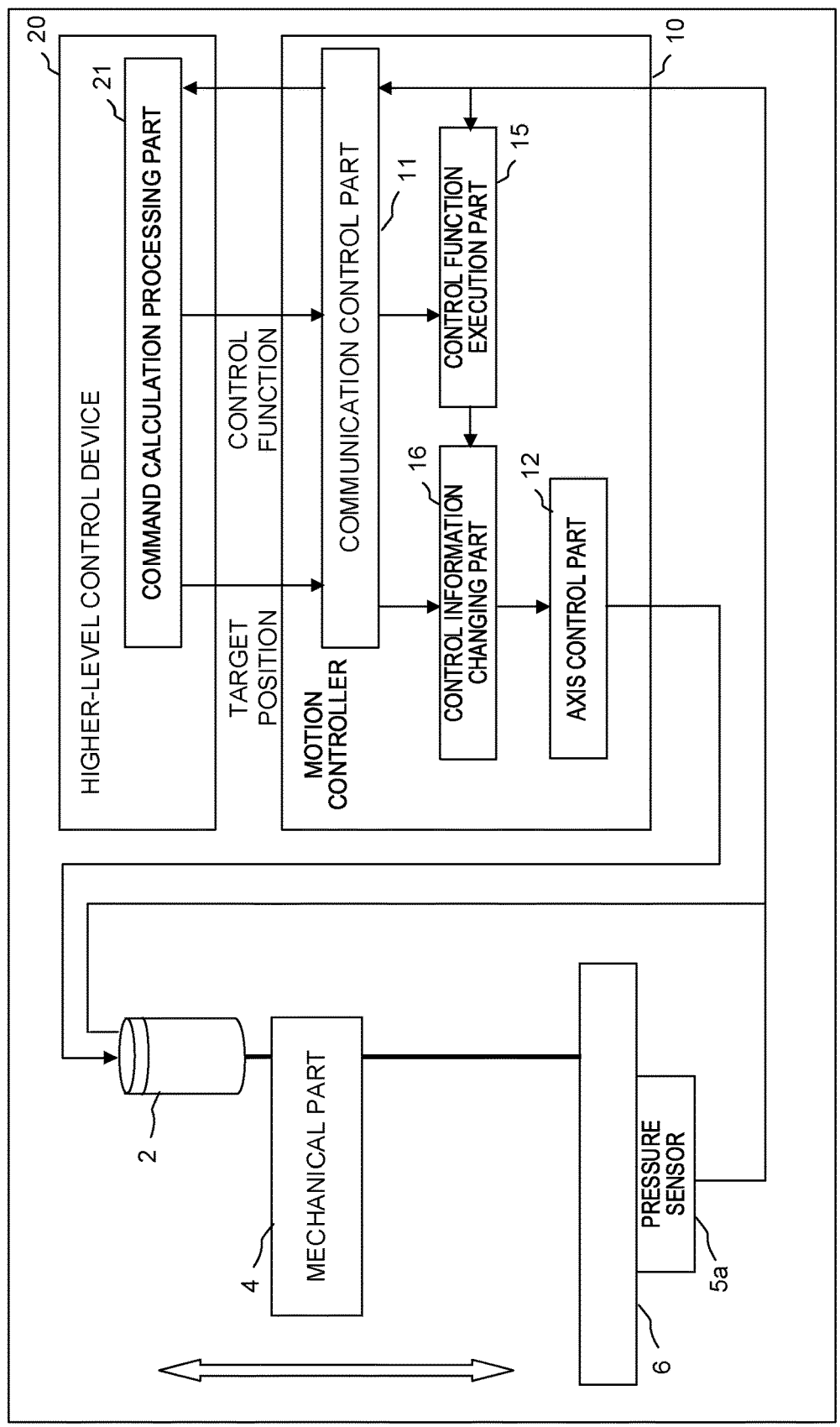
FIG. 3 is a diagram showing an example of controlling a machine by using the motion controller shown in FIG. 1.

FIG. 3 is a diagram showing an example of controlling a machine by the motion controller and the higher-level control device of this embodiment shown in FIG. 1. Note that, in FIG. 3, partial illustration, such as the motor control information storage part 13 and the control function storage part 14, is omitted. In the example of FIG. 3, in addition to creation of a motor control command that directs the target position of the motor 2 or the like and transmission thereof to the motion controller 10, a command calculation processing part 21 provided to the higher-level control device 20 transmits a control function for performing axis control in the pressing operation to the motion controller 10 in performing the pressing operation on a mechanical part 4 against a processed part 6. Prior to transmission of the control function by the higher-level control device 20, the motion controller 10 performs control merely complying with the motor control command transmitted from the higher-level control device 20, the motor control command including the target position; however, by changing or correcting the motor control command by use of the output result obtained by executing the received control function by the control function execution part 15, it is possible to perform axis control for pressing operation with high responsiveness to the sensor value fed back from the pressure sensor 5a. As a concrete example of the control function used in the control shown in FIG. 3, a control function in which, when the sensor value detected by the pressure sensor 5a (pressure value) becomes a certain level or more, the torque limit is increased or decreased in accordance with a difference from a designated target pressure can be considered.

Consideration will be given to a case in which the control function as described above is executed by the control function execution part 15 per every control cycle. Upon receiving a target position as the motor control command from the higher-level control device 20, the control information changing part 16 of the motion controller 10 reflects the value thereof in the moving amount of the motor control information, and outputs the motor control information subjected to reflection to the axis control part 12. Then, the axis control part 12 performs control to move the motor 2 to the designated position. When the mechanical part 4 is pressed against the processed part 6 during the movement, the value of the pressure sensor 5a is sharply increased. At this time, the control function, which is executed by the control function execution part 15 per every control cycle, reacts to the sensor value exceeding a certain value, the sensor value being detected by the pressure sensor 5a, and thereby a torque limit value is outputted in accordance with a difference from a target pressure.

In the control information changing part 16, to which the torque limit value outputted from the control function execution part 15 is inputted, the torque limit of the motor control information is changed by the value of the inputted torque limit, and the changed motor control information is outputted to the axis control part 12. This makes it possible, while the mechanical part 4 is pressed against the processed part 6, to keep the pressing force constant with respect to the sensor value detected by the pressure sensor 5a with high responsiveness.

Next, when control of the motor 2 different from the past is performed, by transmitting a new control function from the higher-level control device 20 to the motion controller 10, different movement of the motor 2 can be performed. Since, different from selecting a control method that has been incorporated in advance, it is possible to achieve a control method that is exactly the one transmitted from the higher-level control device 20, and accordingly, the flexibility in control can be increased.

Moreover, even when the calculation ability of the higher-level control device 20 is small, and thereby a processing execution cycle of the higher-level control device 20 and an execution cycle of communication associated therewith become longer, it is possible to improve the responsiveness to specific sensor feedback information in accordance with the performance of the motion controller 10.

Moreover, when the control function that outputs the torque correction amount is used, the control information changing part 16 performs correction of the motor control information in response to the execution result of the control function executed by the control function execution part 15. In such a case, for example, if it is assumed that the moving amount and the torque command are designated as the motor control information, the control function stored in the motion controller 10 outputs a torque correction amount as the execution result, and the control information changing part 16, which has received the outputted torque correction amount as the input, reflects the inputted torque correction amount in the motor control information. In a concrete example of the control function, when the sensor value detected by the pressure sensor 5a becomes a certain level or more, the torque correction amount is increased or decreased in accordance with a difference from a designated target pressure. Note that, when the control function that outputs the correction value is used, a range of the correctable amount is determined per each kind of the motor control information, and correction to increase or decrease the value is performed within the range.

<Second Embodiment>

Figure 4:
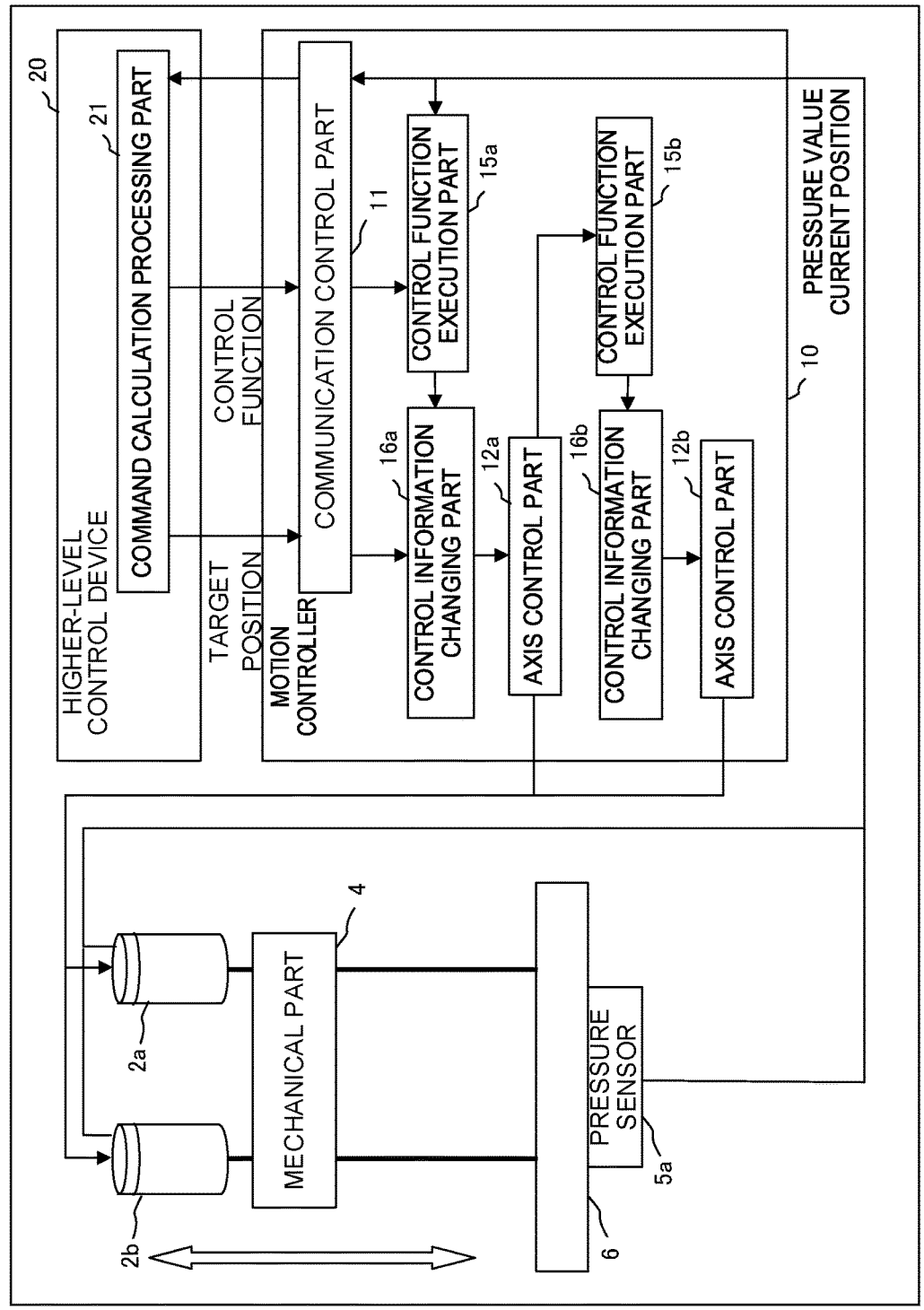
FIG. 4 is a diagram showing an example of controlling a machine by using a motion controller according to a second embodiment of the present invention.
Figure 5:
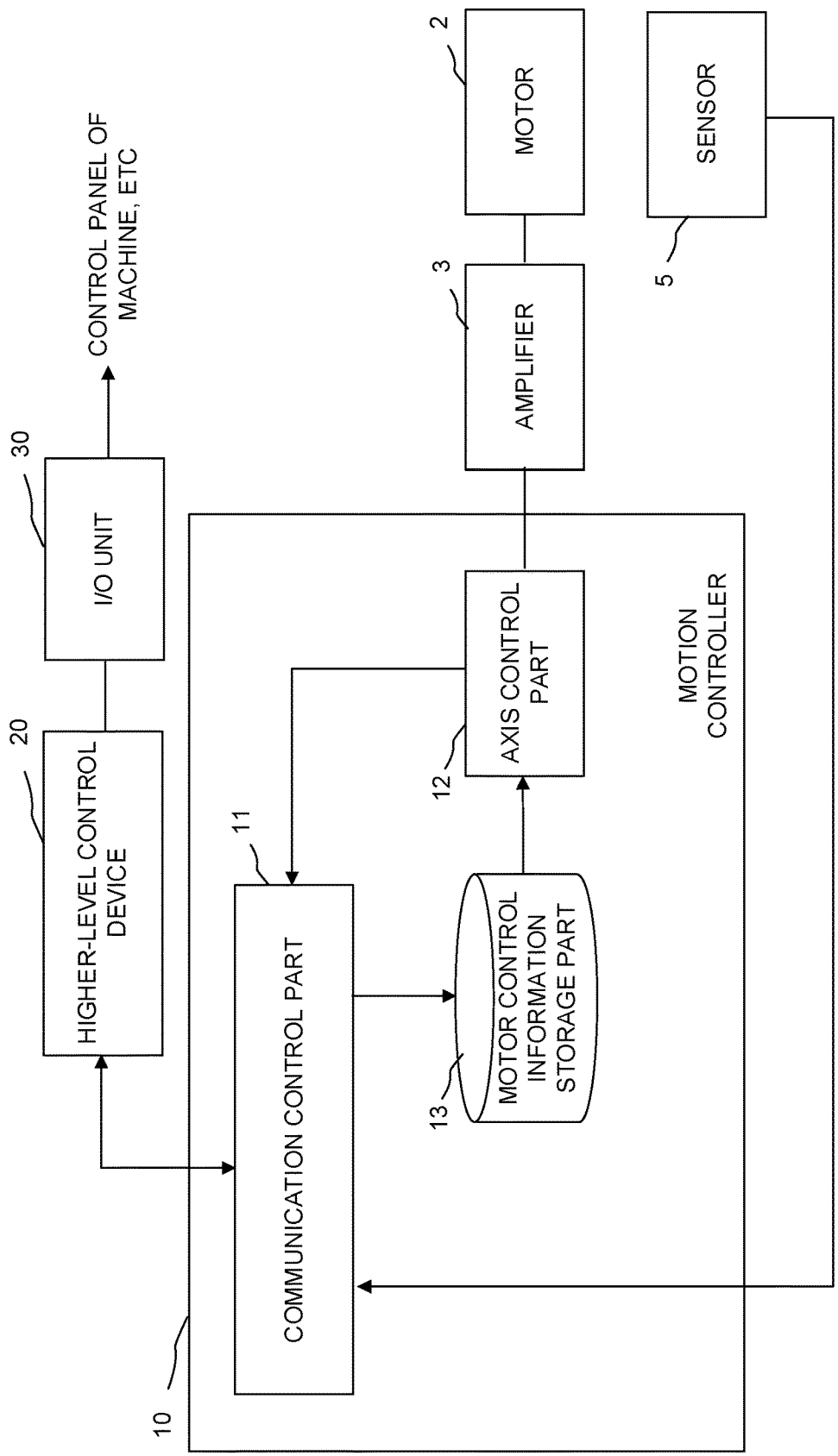
FIG. 5 is a functional block diagram of a motion controller by a conventional art.
Figure 6:
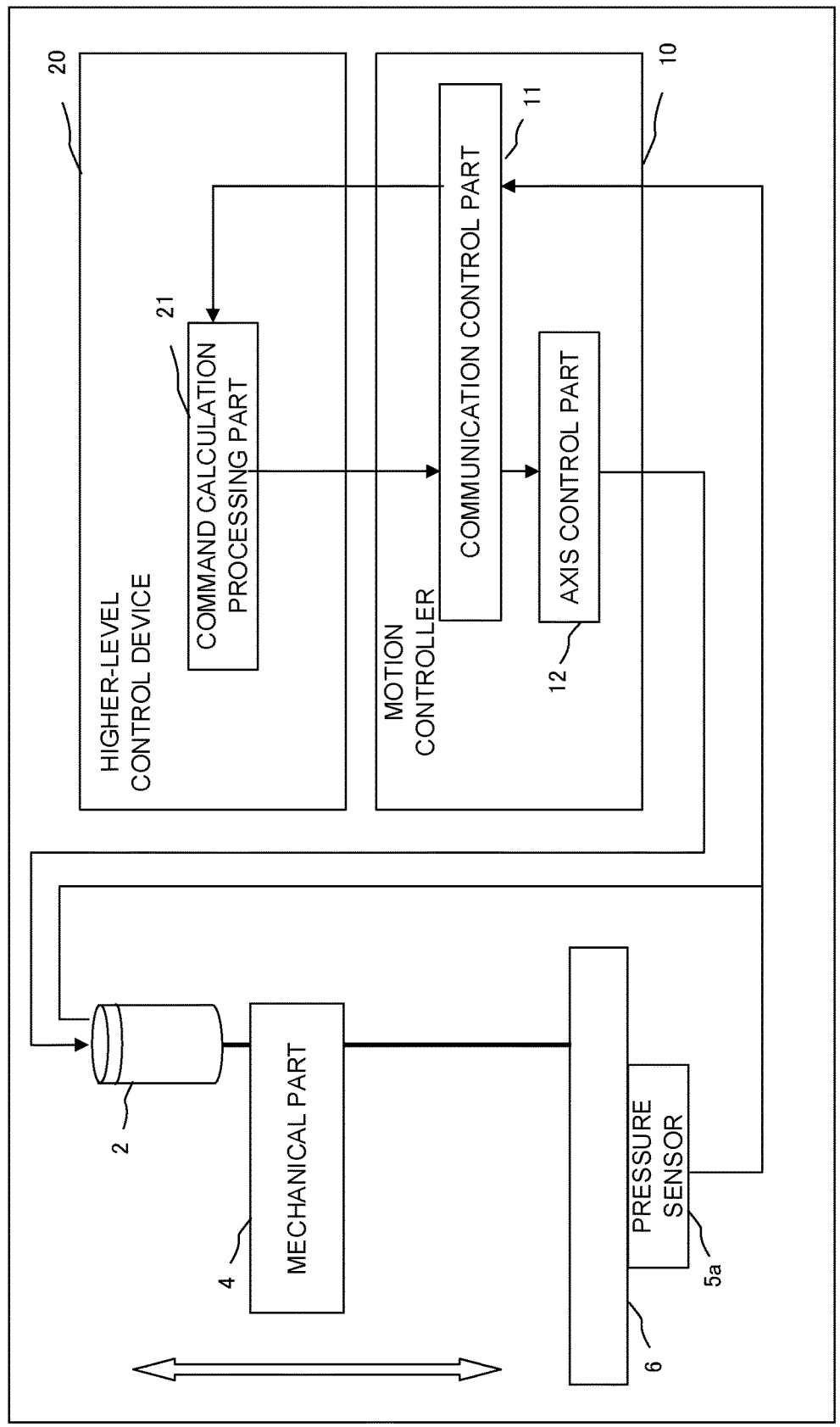
FIG. 6 is a diagram showing an example of controlling a machine by using the motion controller shown in FIG. 5.

The motion controller 10 of the second embodiment is, in the control function execution part 15, able to use information obtained from an axis control part 12, which is different from the axis control part 12 in which the result of execution by the control function execution part 15 is reflected, as an input. For example, as shown in FIG. 4, a system in which the motion controller 10 controls two motors 2a and 2b, and the two motors 2a and 2b are coupled to drive the single mechanical part 4 will be considered. In this case, the motion controller 10 includes the motor control information storage part 13 (not shown), the control function storage part 14 (not shown), the control function execution part 15, the control information changing part 16 and the axis control part 12 for each of the motors 2a and 2b.

In the example in FIG. 4, the control of the motor 2a is, similar to the first embodiment, performed by calculating the torque correction amount in accordance with the sensor value detected by the pressure sensor 5a, for example. Then, in a control function storage part 14b (not shown) storing the control function executed by a control function execution part 15b, "control function that obtains the torque command value of the motor 2a and regards it as the torque command value of the motor 2b" transmitted from the higher-level control device 20 is stored in advance, and the control function execution part 15b of the motor 2b executes the control function per every control cycle. By adopting this, since the same torque command is ordered to the two axes, in the coupled machines, the two axes can cooperate to control the machines.

<Third Embodiment>

When multiple control functions are stored in the control function storage part 14, the motion controller 10 of the third embodiment determines the control function to be executed by the control function execution part 15 based on communication in synchronization with the motor control command transmitted from the higher-level control device 20. A basic functional configuration of the motion controller 10 in this embodiment is similar to that of the first embodiment.

In this case, when transmitting the control functions to the motion controller 10, the higher-level control device 20 associates the identification information with each of the control functions and transmits the control functions, the identification information capable of identifying the control function from other control functions. Moreover, by ordering a sequence or a bit pattern of the identification information corresponding to the control function to be executed, the higher-level control device 20 is able to switch the control method at a desired timing. For example, when a control function is registered, any of numbers 0 to 31 is added as the identification information. The higher-level control device 20 transmits 32-bit data simultaneously with the motor control command, and the motion controller 10 executes all the control functions each having a number corresponding to the ON bit as the identification information. Moreover, on the assumption that the multiple values of 0 to 31 are transmitted simultaneously, all the control functions having those numbers as the identification information are executed.

Consideration will be given to an example in which, similar to the example shown in FIG. 3, the control function that performs calculation of the torque limit value in accordance with the sensor value detected by the pressure sensor 5a is registered to the control function storage part 14 to perform control. In the motion controller 10 of this embodiment, multiple control functions are registered for respective different target pressures and the control functions are switched for a target pressure at the time in the course of the pressing operation; thereby, it becomes possible to change the pressure value in stages.

In addition to the above, by registering the control function that outputs 0 as the torque command when the current value of the motor 2 exceeds a certain value, control of the motor 2 can be immediately stopped when excessive load is applied to the motor 2 during execution of the control function.

In the motion controller 10 of the embodiment, during the pressing operation or any other operations, the machine can be protected by selecting such a control function as the control function to be executed.

<Fourth Embodiment>

The motion controller 10 of the fourth embodiment, in the communication control part 11 with the higher-level control device 20, reception of the control function is performed by synchronizing with the communication for inputting and outputting the motor control command, and dividing the control function into multiple communications. A basic functional configuration of the motion controller 10 in this embodiment is similar to that of the first embodiment.

In an ordinary communication control part 11, there is a limit to the length of data transmittable in one communication cycle. Therefore, when the control function is larger than the length of data transmittable in one communication cycle, the control function is divided into multiple communications and transmitted from the higher-level control device 20. When transmission of all the divided control functions is completed, the divided control functions received at the communication control part 11 are coupled together, and stored into the control function storage part 14. The stored control function becomes executable by the control function execution part 15.

<Fifth Embodiment>

The motion controller 10 of the fifth embodiment, in the communication control part 11 with the higher-level control device 20, reception of the control function is performed by communication in a lower-speed cycle different from high-speed communication for inputting and outputting the motor control command. A basic functional configuration of the motion controller 10 in this embodiment is similar to that of the first embodiment.

The communication control part 11 provided to the motion controller 10 of this embodiment performs communication in a low-speed cycle in remaining time of communication for the motor control command and receives the control function; accordingly, it becomes possible to receive the control function without causing delay in communication of the motor control command.

The description of embodiments according to the present invention has been provided above; however, the present invention is not limited only to the above-described examples of embodiments, and is able to be practiced in various modes by adding appropriate modifications.

What is claimed is:

1. A motion controller, comprising:
   an axis control part that is connected to an amplifier to drive a motor and controls the amplifier based on motor control information;
   a communication control part that receives a motor control command and a control function by communication with a higher-level control device, the motor control command serving as a source for updating the motor control information;
   a control function storage part that stores the control function received from the higher-level control device by the communication control part;
   a control function execution part that performs execution of the stored control function using, as an input, at least one of information of the motor and information of a sensor; and
   a control information changing part that changes the motor control information based on a result of the execution of the stored control function at the control function execution part, wherein
   the motor control information changed by the control information changing part serves as an input to the axis control part, and
   the communication control part receives the control function in a communication cycle different from a communication cycle of the motor control command.

2. The motion controller according to claim 1, wherein the control function execution part is configured to use information of another motor, which is different from the motor, as the input for the control function.

3. The motion controller according to claim 1, wherein
   the control function execution part is configured to select a control function to be executed from among multiple control functions in synchronization with the motor control command, and
   the control information changing part changes the motor control information based on a result of execution of the selected control function.

4. The motion controller according to claim 1, wherein the communication control part receives the control function by dividing the control function into multiple communications in synchronization with the motor control command.

* * * * *